INVENTOR.
Clarence B. Coleman

Nov. 28, 1967   C. B. COLEMAN   3,354,918
BIN AND UNLOADING STAND

Filed Feb. 21, 1966   2 Sheets-Sheet 2

INVENTOR.
Clarence B. Coleman
BY Warren, Brosler, Cypher & Anglim Attorneys

United States Patent Office 3,354,918
Patented Nov. 28, 1967

3,354,918
BIN AND UNLOADING STAND
Clarence B. Coleman, Oakland, Calif. (2401 Merced St., San Leandro, Calif. 94577)
Filed Feb. 21, 1966, Ser. No. 528,944
5 Claims. (Cl. 141—363)

ABSTRACT OF THE DISCLOSURE

In storage bins of the type utilized in the transportation and storage of a wide variety of bulk materials, an arrangement wherein such a bin is provided with base supports designed to be received and located on an unloading stand which carries a conduit adapted to receive material discharged from the bin through a bottom discharge opening. The receiving conduit is provided with an annular spring member which in turn supports a ring member which defines a mouth of the receiving conduit and has mounted thereupon a gasket which operably engages and seals the bin discharge opening when the bin base supports are registerably received by the conduit stand. The discharge bin is also provided with a plate for lateral reciprocation across the discharge opening of the bin and manually operable cams secured to the bin for sealably holding and releasing the plate in various positions.

---

This invention relates generally to large storage containers or bins for storing and transporting bulk materials and, more particularly, relates to a bulk material bin constructed for gravity discharge of the contents therefrom and an unloading device to facilitate such discharge.

Large containers for the transportation and storage of a wide variety of bulk materials are extensively used throughout industry today. Most of these storage bins or containers are constructed so that they will discharge their contents primarily under the influence of gravity, although some of them may be aided by such mechanical devices as stirrers or agitators. While the contents of the bin may be discharged directly upon a floor, it is often advantageous to provide a discharge device or apparatus which is suitable for conveying the bulk material into smaller containers or into other areas. The bins and unloaders heretofore employed have been found to have many disadvantages. For example, it is often highly advantageous to be able to selectively open and close the bin discharge opening to thereby partially discharge the contents of the bin into the unloader. Moreover, many of the bin-unloader combinations have provided an unsatisfactory sealing between the two components due to the variation in the dimensions of the bins.

It is an object of the present invention, therefore, to provide a bin and unloading stand having an improved and more easily and uniformly effected seal between the bin and stand.

Another object of the present invention is to provide a bin and unloading stand which allows the partial unloading of the contents of the bin and better control of discharge therefrom.

Still another object of the present invention is to provide a bin and unloading stand which is easy to manufacture, has better durability, has fewer components and is inexpensive to construct.

The invention possesses other objects and features of advantage, some of which of the foregoing will be set forth in the following description of the preferred form of the invention which is illustrated in the drawing accompanying and forming part of the specification. It is to be understood, however, that variations in the showing made by said drawing and the description may be adopted within the scope of the invention as set forth in the claims.

Referring to said drawing.

Figure 1:
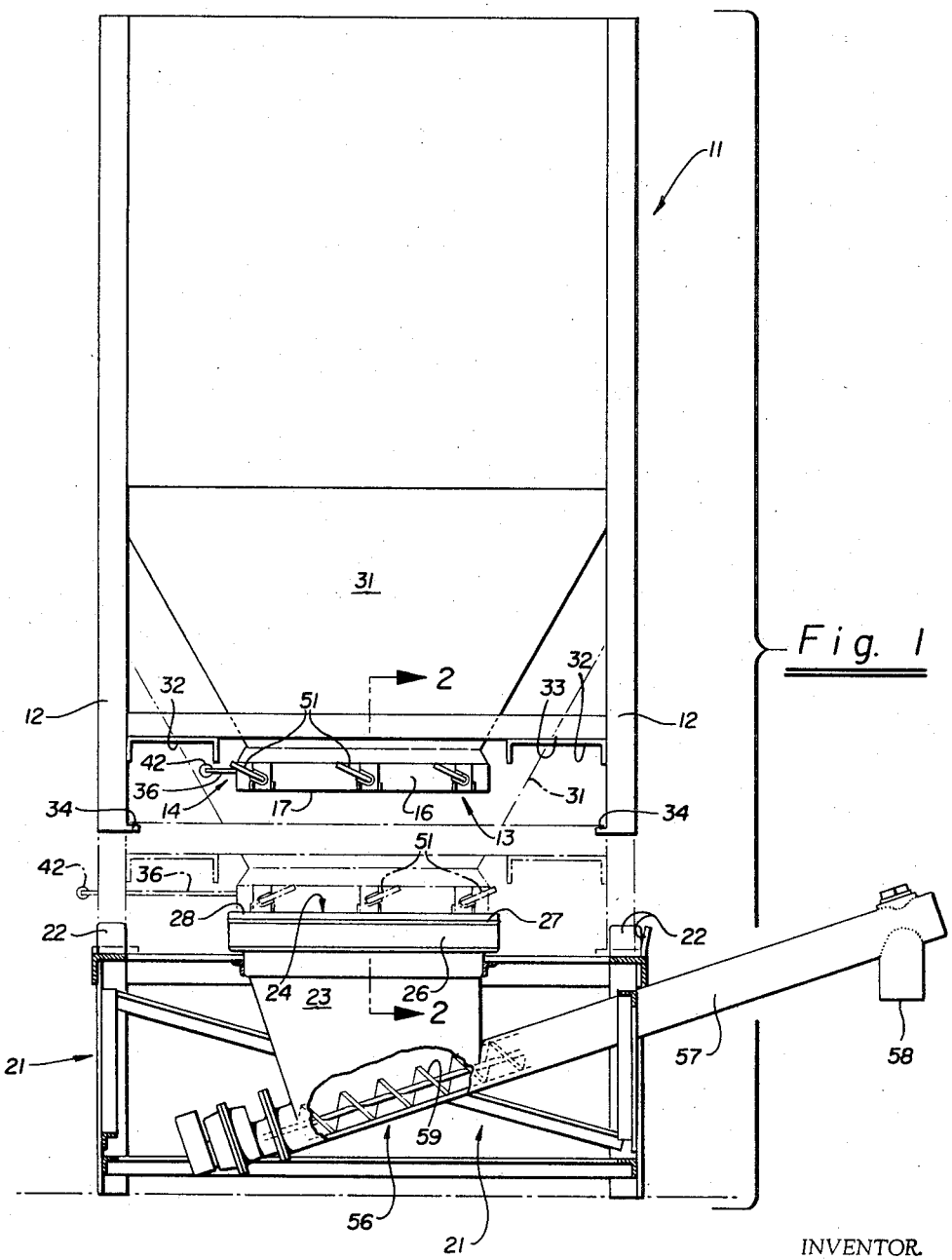
FIGURE 1 is a side elevational view partially in cross-section and partially broken away of a bin and unloading stand constructed in accordance with the present invention with the bin shown mounted on the stand by phantom lines.
Figure 2:
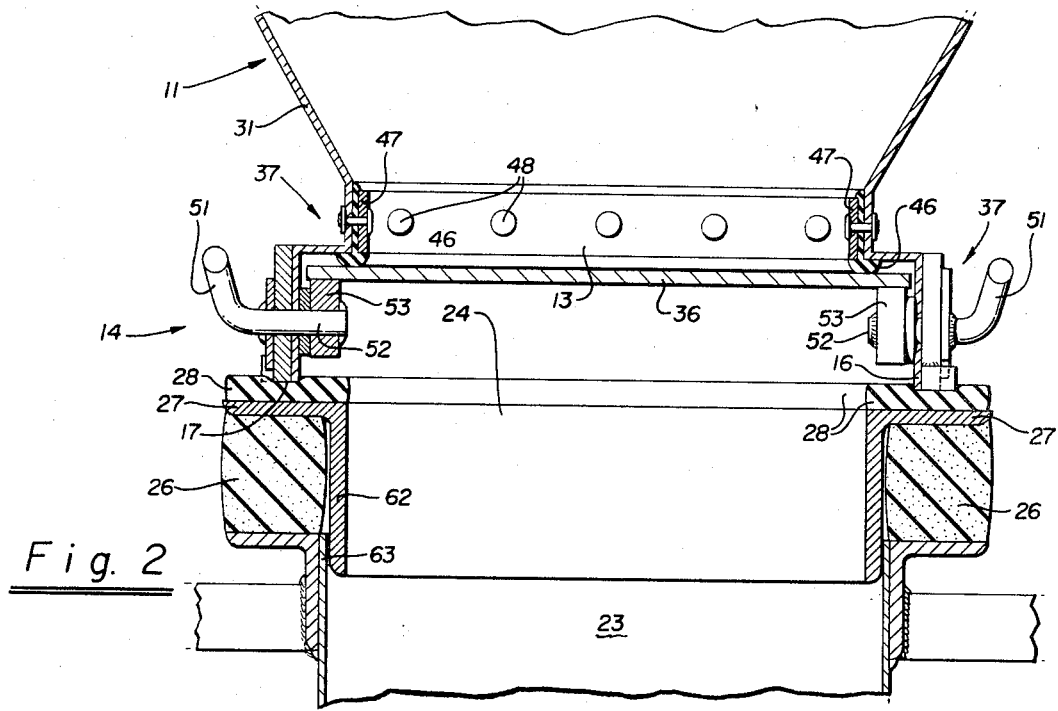
FIGURE 2 is a fragmentary end view in cross-section taken on the line 2—2 in FIGURE 1.

The bin and unloading stand of the present invention comprises, briefly, a bin 11 having base supports 12 and a discharge opening 13 and closure means 14 therefor and a wall 16 surrounding the opening 13, a receiving conduit 23 and bin supporting means 21 adapted to receive and locate the base supports 12 with the bin opening 13 in registration with the conduit 23, an annular spring member 26 of resilient impervious material mounted in sealed relation on the conduit 23, a gasket supporting ring member 27 supported for vertical reciprocation on the spring 26 in sealed engagement therewith, and a sealing gasket 28 mounted on the ring 27 in sealed relation thereto and being formed and positioned for receiving and supporting the wall 16 in sealed relation therewith.

The bin 11, as shown in its entirety in FIGURE 1, is of the general type used in the transportation and storage of bulk materials. The bin is filled through an opening (not shown) in the upper end thereof and is provided with base supports or legs 12 and a truncated section 31 terminating in a bottom wall 16 defining the bottom discharge opening 13. Secured to the legs 12 are two pairs of inverted channel members 32 and 33 which are dimensioned to receive the tines of a fork lift in order that the bin may be moved from place to place and to facilitate the placement of the bin 11 on the supporting means or stand 21. The pairs of channels 32 and 33 are mounted on the legs 12 in mutually perpendicular fashion so that the fork lift may pick up the bin from any side thereof. The truncated section 31 causes the materials in the bin to flow evenly under the action of gravity and facilitates the discharge from the opening 13. Formed on the lower end of the legs 12 are flanges or feet 34 which provide for bin stability and facilitate the mounting of the bin upon the stand 21.

The wall 16 is preferably formed as a depending annular wall which carries the closure means 14 and which sealably mates with the gasket 28. The depending annular construction of the wall 16 provides a gasket engaging bottom wall portion 17 of relatively small area thus insuring a tight seal around the opening 13 between the gasket 28 and the wall 16. The wall 16 also may be easily adapted to carry the closure means 14.

In order to facilitate the partial unloading and better control of the discharge of the contents of the bin 11, a feature of the present invention is to construct the closure means 14 as a plate 36 slidably carried by the annular wall 16 for lateral reciprocation across the opening 13 to selectively regulate discharge flow therethrough. As thus constructed, the plate 36 may be laterally moved to any desired position by manually engaging a handle 42 provided along one edge of the plate.

Figure 3:
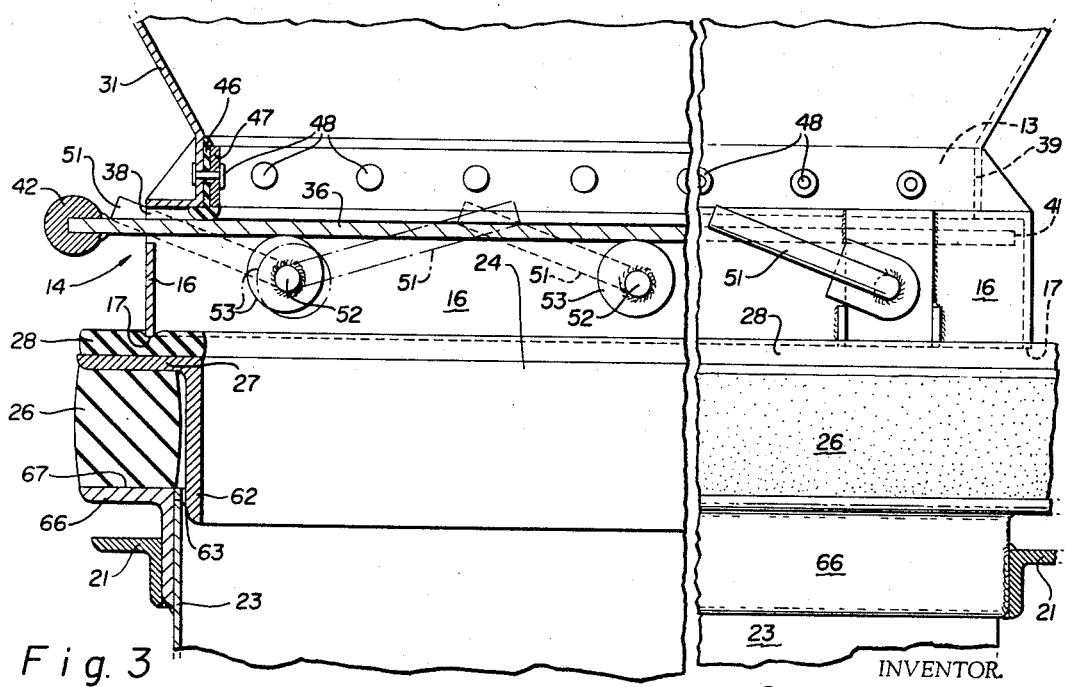
FIGURE 3 is a fragmentary side view partially in cross-section of the bin closure and sealing assembly.

As shown in the drawings, the annular wall 16 is of a rectangular cross-section, although circular and other polygonal shapes may be used to surround and help define the discharge opening. Other annular members referred to herein may also be constructed of polygonal or arcuate shapes. As best seen in FIGURE 3, the plate 36 extends through an opening 38 in a short side of the rectangular annular wall 16. As thus constructed, the sensitivity of control over the opening as defined by side wall 39 and end 41 of plate 36 is maximized due to the fact that plate 36 may be withdrawn gradually over the length of the long side of the rectangular cross-section.

A sealing means 46 is mounted surrounding the opening 13 to provide a sealing gasket therearound. The means 46 is secured to the bin walls by an internal ring-shaped member 47 and a plurality of rivets 48, passing through the members 47, 46 and the bin wall. Extending through and rotatably mounted in the annular wall 16 are a plurality of manually operable cams 53, which are preferably formed with L-shaped rods 51 having their long side extending out as lever arms and the short side 52 extending through the annular wall 16. The cams 53 are carried by the wall 16 for engagement and displacement of the plate 36 into and out of engagement with the sealing gasket 46. The selective sealing of the plate 36 and member 46 are best seen in FIGURE 3. As there illustrated, it can be seen that with the cam arm member 51 in the position shown by the dotted and solid lines, the plate 36 is in sealed engagement with the member 46, while the cams 53 allow the plate 36 to move or drop away from the member 46 for lateral reciprocation when the arm 51 and a cam 53 are in the positions shown by the phantom lines. As also can be seen in FIGURE 3, the cams 53 act as supports for and guide the lateral reciprocation of the plate 36 when it is released from the sealing member 46. It is preferable to place approximately three or four cams on each side of the rectangle in order to achieve a uniform seal of the plate 36 with member 46 and to allow the plate 36 to be evenly supported upon lateral reciprocation to the various selected positions.

Referring to the receiving conduit 23 and bin supporting means 21 in more detail, it is a feature of the present invention in order to achieve an accurate registration of the conduit 23 and the opening 13 to construct the supporting means 21 as a generally box-like stand or frame 21. The stand 21 has portions 22 which are in the form of upstanding flanges having a taper to receive and guide the bin base supports 12 and feet 34 into registered engagement therewith. As thus constructed, the conduit 23 is carried by the stand 21, although the conduit 23 and stand 21 can be independently supported and positioned for registration under the bin 11. The conduit 23 has an open upper end 24 in vertical registration with the discharge opening 13 when the bin is mounted on the stand 21. The base supports 12, annular wall 16, portions 22, conduit 23 and sealing gasket 28 are dimensioned and positioned relative to each other in the vertical direction so that the gasket 28, preferably formed from rubber and adhesively secured to the member 27, will always engage the lower end 17 of the wall 16 and yield downwardly prior to the point when, under the load of the bin against resistance of the spring 26, the feet 34 come fully to rest on the stand receiving portions 22 to provide a pressure sealed engagement with the wall 16. This is true as spring 26 will take up substantial variations in the vertical dimensions of any given type of bin 11.

Mounted on the bottom end of the conduit 23 is a conveyor means 56 which is comprised of a tube or duct 57 terminating in a discharge opening 58 and having a motor driven screw-type conveyor 59 mounted therein. Other conveyor means may be easily adapted for use with the bin and unloading stand of the present invention.

In order to provide a sealing force between the gasket 28 and annular wall 16 which is uniform around the entire wall and substantially maintains this uniformity despite relative annular displacement between the wall and gasket, the spring member 26 is constructed with an annular cross-section and is positioned immediately adjacent the open end 24 of the receiving conduit 23. The use of an annular spring immediately adjacent the receiving opening 24 ensures that the gasket 28 will engage the wall 16 evenly around its perimeter despite the fact that the wall may be skewed somewhat to the surface of the gasket 28 as the bin is placed upon the stand.

As a further feature of the present invention in order to more uniformly support the gasket 28 in sealing engagement with the annular wall 16, the annular spring is formed of a resilient foamed material which is impervious to the bulk material being discharged and thus forms a part of the discharge conduit through which the material flows. Various densities of foamed rubber, natural or synthetic, such as polyurethane, have been found to be satisfactory. The spring member 26 is preferably bonded to the flange 66 along the surface 67 by suitable adhesive although the spring may merely be placed on the surface and sealed by the weight of the bin. The use of a continuous impervious resilient annular spring eliminates the need for a separate expansion sleeve.

As a further feature of the present invention, the sealing assembly is given lateral stability in conjunction with its vertical reciprocation. This is here accomplished by providing a depending annular skirt 62 on ring member 27 and which is positioned internally of the annular spring 26 and the open upper end 63 of conduit 23, thus affording a guided telescopic assembly. The extension of the skirt 62 into the conduit 23 will cause the ring member 27 and gasket 28 mounted thereon to be held in registration for guided reciprocation in an axially aligned manner with the conduit 23. Thus, when the bin 11 is placed upon the gasket 28, the skirt will guide the downward displacement of the spring 26 under the load of the bin and will function to contain the lateral expansion of the foam material of which the spring is formed. Moreover, the skirt will also tend to minimize abrasive wear of the foam spring 26 as it shields the spring from discharge of the contents of the bin into the conduit 23.

I claim:

1. A bin having base supports and a discharge opening and a closure means therefor, said discharge opening being formed in the bottom of said bin, a depending annular wall surrounding said discharge opening, a receiving conduit and bin supporting means adapted to receive in and locate said base supports with said bin opening in registration with said conduit, said bin supporting means comprising a stand having portions adapted to receive and locate said base supports and said conduit carried by said stand and having an open upper end in vertical registration with said discharge opening when said bin is mounted on said stand, an annular spring member of resilient impervious material mounted in sealed relation on said conduit, a gasket supporting ring member supported for vertical reciprocation on said spring member in sealed engagement therewith, and a sealing gasket mounted on said ring member in sealed relation thereto and being formed and positioned for receiving and supporting said wall in sealed relation therewith by engaging the lower end of said annular wall and yielding downwardly under the load of said bin against resistance of said spring member to provide a pressure sealed engagement with said wall.

2. A structure as defined in claim 1, wherein said ring member is formed with a depending annular skirt mounted internally of said spring member and the open upper end of said conduit and dimensioned for axial guided reciprocation in said spring member and conduit.

3. A structure as defined in claim 1, wherein said closure means comprises a plate slidably carried by said annular wall for lateral reciprocation across said discharge opening to selectively regulate the discharge flow therethrough.

4. A structure as defined in claim 3, sealing means surrounding said opening, and a plurality of manually operable cams carried by said annular wall for engagement with and displacement of said plate into and out of engagement with said sealing means for sealing said opening and releasing said plate for lateral displacement respectively.

5. A structure as defined in claim 1, wherein said annular spring member is formed of continuous, resilient, foamed material.

References Cited

UNITED STATES PATENTS

| | | | |
|---|---|---|---|
| 1,484,356 | 2/1924 | Montgomery | 222—165 |
| 1,794,714 | 3/1931 | Kiplinger. | |
| 2,075,931 | 4/1937 | Eades. | |
| 2,535,476 | 12/1950 | Anderson | 214—307 X |
| 3,171,449 | 3/1965 | Ellms et al. | 141—364 X |

HUGO O. SCHULZ, *Primary Examiner.*